United States Patent [19]
Deppe

[11] 3,958,707
[45] May 25, 1976

[54] CONTAINER TRANSPORT TRAILER

[76] Inventor: David L. Deppe, 521 - 3rd Ave., Baraboo, Wis. 53913

[22] Filed: June 24, 1974

[21] Appl. No.: 482,519

[52] U.S. Cl. .............................. 214/390; 214/515; 254/10 C; 254/49
[51] Int. Cl.² ................................................ B60P 1/64
[58] Field of Search ........... 214/390, 515, 392, 394; 248/354 P, 352; 254/10 R, 10 B, 10 C, 2 C, 45, 49, 50

[56] References Cited
UNITED STATES PATENTS

| | | |
|---|---|---|
| 2,934,220 | 4/1960 | Murphy .......................... 254/10 C X |
| 3,286,986 | 11/1966 | Blankenship ..................... 214/390 X |
| 3,378,155 | 4/1968 | Steiner ............................... 214/390 |
| 3,710,524 | 1/1973 | Seiz ............................ 214/38 BB X |
| 3,747,787 | 7/1973 | Sloan et al. ......................... 214/390 |
| 3,834,568 | 9/1974 | Larson et al. .................... 214/390 X |

FOREIGN PATENTS OR APPLICATIONS 529,549  1/1921  France ............................ 248/354 P

*Primary Examiner*—Albert J. Makay
*Attorney, Agent, or Firm*—Allegretti, Newitt, Witcoff & McAndrews

[57] ABSTRACT

A container transport trailer is provided having a bottomless U-shaped support frame including a cross member and a pair of side members. A lift member is connected to the forward end of the trailer and cooperates with a pair of support arms pivotally connected to the rear ends of the side members of the U-shaped frame to engage against the rear portion of the article. The trailer is suspended above the surface within the U-shaped frame on the lift member and the support arms for travel and is lowered to the ground by the lift member for release.

8 Claims, 4 Drawing Figures

CONTAINER TRANSPORT TRAILER

BACKGROUND OF THE INVENTION

The present invention is generally related to a bottomless article transport trailer. Numerous article transport trailers have been constructed in the prior art. Examples of these article transport trailers are shown in various prior art references known to applicant.

Of these references the Black U.S. Pat. No. Re. 24,227 is considered the most pertinent. This patent sets forth a straddle-type trailer for picking up a cotton-carrying basket. The trailer is U-shaped and includes dual front pressure actuating cylinders pivotally mounted on the side frames. Connected to the front wall of the basket are forwardly projecting lugs having abutment surfaces adapted to engage a front transverse lifting bar which is operably connected to the cylinders for lifting the front end of the basket. Dual rear pickup links are pivotally mounted on supports connected to the rear portions of the side members. The pickup links are connected by tie rods to the transverse pickup bar and are operably connected to the dual cylinders. The pickup links include horizontally disposed pickup surfaces and vertically disposed abutment surfaces. When the cylinders are actuated the trailer components move from the position shown in FIG. 2 to that shown in FIG. 3.

While Black was generally effective for its intended purpose, its linkage and pickup system was somewhat complicated and expensive to construct and had a multiplicity of parts requiring repair and servicing. It also required operative connections between the rear pickup links and the forward cylinders.

SUMMARY OF THE INVENTION

The present invention is related to a bottomless article transport trailer. The invention includes a U-shaped support frame mounted for vehicular movement on a pair of wheels rotatably connected to the frame. The frame has a cross member and a pair of side members with the cross member being connected to the front ends of the side members. Also included is a lift member operable between an article conveying position and an article release position. The lift member is connected adjacent the cross member of the U-shaped frame and is connectable with the front end of the article to be transported. The lift member is adapted to lift the front end of the article upward and inwardly of the U-shaped frame.

The invention also includes a pair of elongated independent support arms for cooperating with the lift member. The support arms are pivotally connected to the rear ends of the side members of the U-shaped frame. The support arms are adapted to engage against opposite sides of the rear portion of the article with the support arms extending upwardly away from the lift member when in article engaging position. The support arms are adapted to cooperate with the lift member to lift the rear portion of the article upwardly and inwardly of the U-shaped frame when the lift member is operated so that the article may be suspended for vehicular movement within the bottomless trailer above the surface supporting the wheels of the trailer.

Accordingly, it is an object of the present invention to provide a new and improved bottomless article transport trailer.

It is a further object of this invention to provide such a trailer having efficient and economic construction.

A still further object of the present invention is to provide a bottomless article transport trailer having a minimum of parts which may be produced with a minimum of cost which is adapted to be used in conjunction with a container for garbage and the like.

A still further object of the present invention is to provide an article transport trailer having a lift member in the front section thereof and rear support arms cooperating with the lift member connected to the rear of the trailer and in which no linkage is required to be connected between the lift member and the rear support arms.

Still a further object of the present invention is to provide a container transport trailer especially adapted for use with sturdy, rigid articles such as garbage containers in which the trailer may be easily and efficiently connected to the container to suspend the container within the trailer.

These and other objects and advantages of the present invention will be more fully understood by reference to the detailed description of the preferred embodiment which follows.

BRIEF DESCRIPTION OF THE DRAWINGS

There follows a brief description of the drawings showing a presently preferred embodiment of the present invention wherein like numerals refer to like elements and wherein.

DETAILED DESCRIPTION OF THE PREFERRED EMBODIMENT

Figure 1:
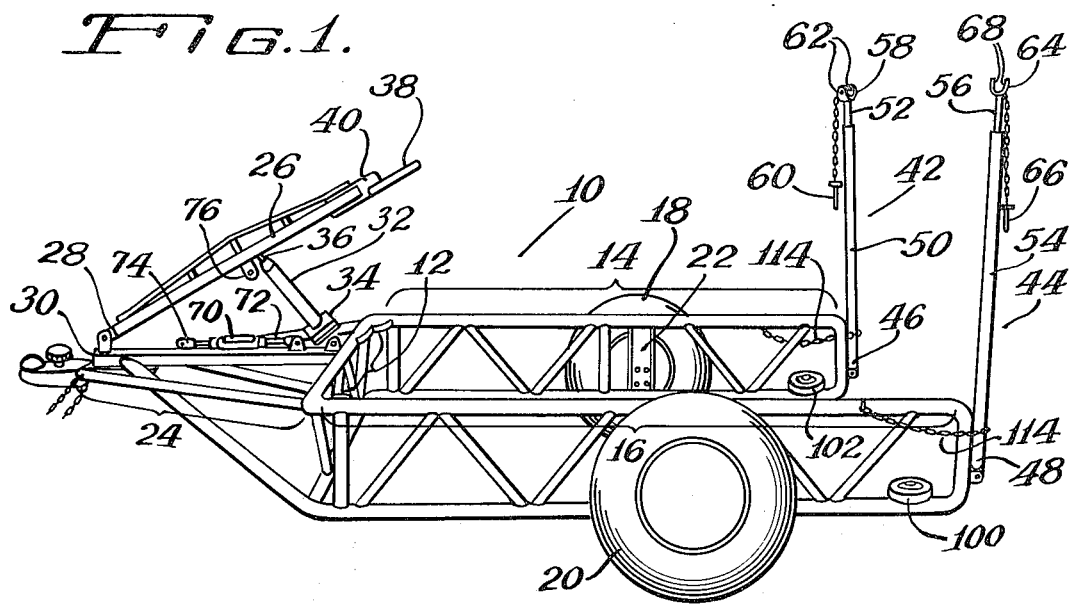
FIG. 1 is a side perspective view of the trailer of this invention with the trailer in travel position without a container.

Referring to FIG. 1, the trailer of this invention 10 is a bottomless article transport trailer for transporting an article such as a container. The bottomless trailer 10 includes a U-shaped frame having a cross member 12 and side members 14 and 16. The cross member 12 is connected to the front end of the side members 14 and 16. Cross member 12 and side members 14 and 16 each include upper and lower longitudinal support bars connected by strut members. The U-shaped support frame is mounted for vehicular movement on a pair of wheels 18 and 20 rotatably connected to brackets 22 and 24 (not shown). The brackets 22 and 24 are connected to the side members 14 and 16 respectively. The trailer 10 also includes a hitch section 24 connected to the cross member 12. Lift means are provided for the trailer and include a lift arm 26 pivotally connected at one end 28 to a longitudinal member 30 on the hitch section 24 and an hydraulically operated cylinder or power means 32 pivotally connected at one end 34 to the longitudinal member 30. The hydraulic cylinder 32 is connected at its operating end 36 to the lift arm 26. The lift arm 26 also includes a container engaging finger 38 connected to the operating end 40 thereof. The hydraulic cylinder 32 is connected to the lift arm 26 at a point closer to the end 40 than the end 28.

A pair of elongated independent support arms 42 and 44 are pivotally connected at ends 46 and 48 thereof to the rear portions of the side members 14 and 16. The support arm 42 includes an outer sleeve 50 which is pivotally connected to the side member 14 and an inner telescoping member 52 which may be extended outwardly from the sleeve 50. The support arm 44 includes a telescoping sleeve member 54 pivotally connected to the side member 16 and an inner telescoping member 56 within the sleeve member 54 and extendable outwardly therefrom.

The inner telescoping member 52 includes article receiving means 58 which means is an open ended U-shaped collar member. A restraining pin 60 is provided and insertable into holes 62 defined in the ends of the collar 58.

The inner telescoping member 56 includes an article receiving means 64 which is an open ended U-shaped collar member. The article receiving means 64 is provided with a restraining pin 66 connectable within holes (not shown) 68 defined within the ends of the article engaging member 64 to hold the member 64 therein.

The trailer 10 also includes a forward support arm 70 which in one particular form is a turn buckle. The forward support arm 70 pivotally connected at one end 72 to the longitudinal member 30 of the trailer 10 just forward of the connection of cylinder 32 to member 30. The other end 74 of the forward support arm 70 is pivotally connectable to a bracket 76 on the bottom side of the central portion of the lift arm 26.

Figure 2:
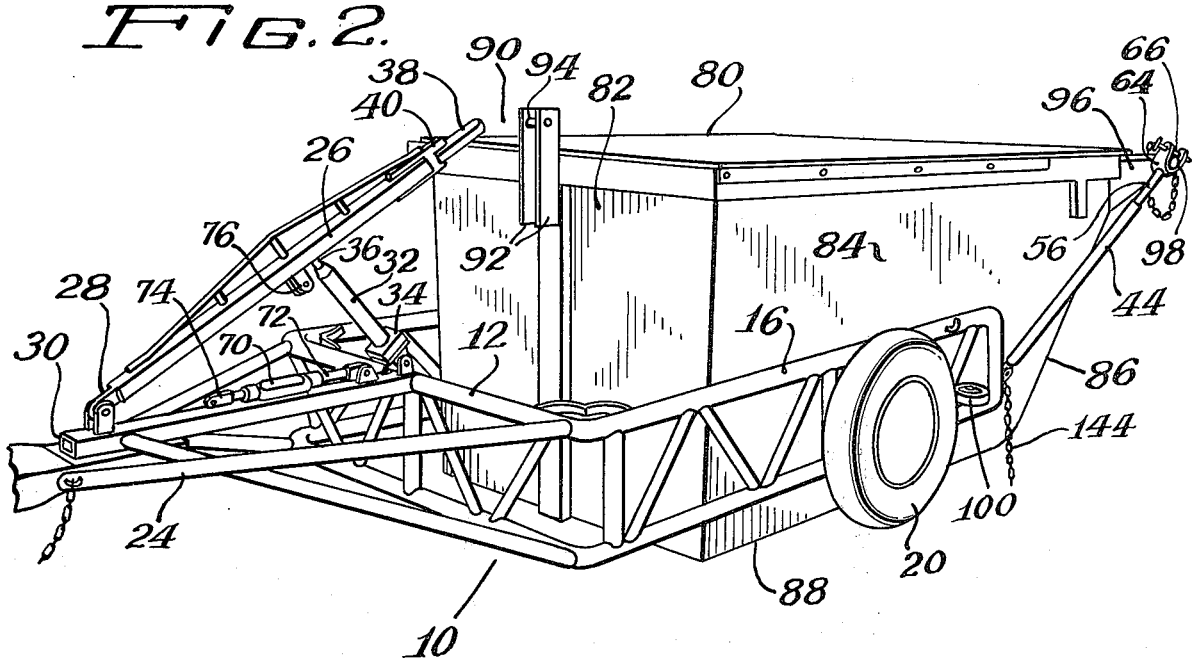
FIG. 2 is a second side perspective view of the trailer of this invention and a container adapted for use with the trailer with the trailer in the partially loaded position.

The trailer 10 of this invention shown). specifically adapted for use with a sturdy, rigid container such as a garbage container 80 shown in FIG. 2. However, the trailer 10 of this invention could be adapted for use with other containers as well. Referring now to FIG. 2 a sturdy metal container 80 is shown having a forward front face 82, side faces 84 (only one of which is shown) and a back face 86 (not shown). The container also includes a bottom 88 (also not shown.). Connected to the front face 82 of the container 80 is a mounting bracket 90 having two vertically oriented plate members 92 and a lift arm engaging shaft 94 horizontally connected between upper sections of the plate members 92.

The container 80 also includes at its rear section and connected to the rear face 86 thereof a pair of extension members 96 (only one of which is shown) which extend laterally outward from the side faces 84 of the container 80. The extension members include connecting arms 98 extending outwardly therefrom and adapted to fit complimentary within the article receiving U-shaped collar members 58 and 64 of the elongated rear support arms 42 and 44.

The trailer 10 also includes article guide members which in the preferred embodiment are rollers 100 and 102 rotatably connected about vertical axes to the rear portion of the side members 14 and 16. The rollers 100 and 102 engage against and guide the container 80 into and out of the U-shaped frame of the trailer 10.

OPERATION OF THE TRAILER

Referring now to FIG. 2, the trailer 10 has been backed into position astride the container 80 with the rollers 100 and 102 (not shown) engaging against and guiding the side members 84 of the container 80 into the trailer 10.

The trailer 10 is backed into position straddling the container 80. The inner telescoping member 56 of rear support arm 44 is extended until the article engaging collar member 64 fits complimentary upwardly against the connecting arm 98 of the extension 96. The pin 66 is then inserted through the holes of the collar member 64 to secure the connecting arm 98 within the collar 64. The other support arm 42 is connected identically and that description will not be repeated. The trailer 10 may then be backed further until the front face 82 of the container 80 contacts the cross member 12 of the trailer 10. In this position the container engaging finger 38 fits between the plate members 92 and under the shaft 94.

Figure 3:
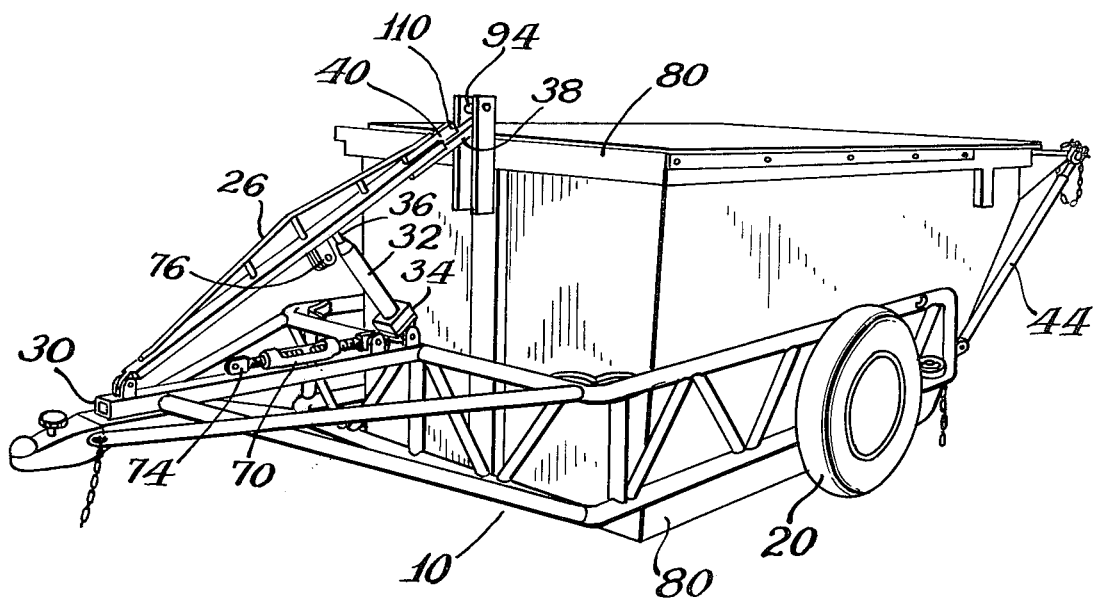
FIG. 3 is a side perspective view of the trailer connected to a container adapted for use with the trailer with the container in the unload position.

Referring to FIG. 3, the container 80 remains on the surface against which the wheels 18 and 20 (only one shown) ride. The hydraulic cylinder 32 is then operated to pivot the lift arm 26 counterclockwise, raising the end 40 of the arm 26. The container engaging finger 38 bears upwardly against the shaft 94 of the container 80 to lift the container upwardly and into the trailer 10. During the lifting operation the force exerted by the lift arm 26 against the container 80 is transmitted through the container 80 (which is of a sturdy, rigid material such as steel plate) to the arms 44 and 42. The support arms 42 and 44 (only one shown) then cooperate with the lift arm 26 and container 10 to lift the container upwardly and into the trailer. This invention requires no linkage between the lift arm 26 and the support arms 42 and 44. Also, no linkage is necessary between the support arms 42 and 44. After the lift is completed and the trailer container 80 is raised upwardly above the surface against which the wheels 20 and 18 ride, the shaft 94 abuts a stop member 110 of the lift member 26.

The trailer 10 of this invention lifts the container 80 upwardly and into the trailer 10 with a single lift member 26 and two cooperating support arms 42 and 44. The first lift arm 26 contacts the container 10 at a point forward of its center of gravity and the suport arms 42 and 44 engage the container 80 at points to the rear of the center of gravity. The support arms 42 and 44 when in operative position engaging the container 80 extend upwardly and away from the lift arm 26 with the lift arm 26 extending upwardly and towards the support arms 42 and 44. In this manner the lift arm 26 and support arms 42 and 44 all pivot in the same rotational direction (counter-clockwise as the trailer 10 is viewed from FIG. 1).

Figure 4:
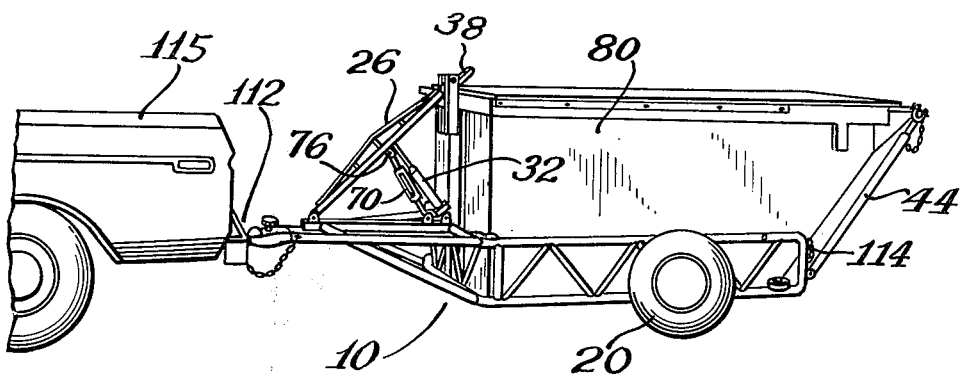
FIG. 4 is a side perspective view of the trailer and container for use with the trailer of this invention in the travel position, and a partial view of a vehicle to which the trailer is connected.

Referring now to FIG. 4, the container 80 is shown in the travel position suspended above the surface against which the wheels 18 and 20 (only one shown) ride. The trailer 10 is connected to a hitch bar 112 of a vehicle 115. In the travel position the power cylinder 32 is extended sufficient to rotate the lift arm 26 to lift the container 80 above the travel surface. The turn buckle 70 is raised and attached to the bracket 76 of the lift arm 26 to alleviate all load pressure from the cylinder 32 during travel. The turn buckle 70 functions as a forward support arm for the lift arm 26 to maintain the trailer and container in the travel position.

After the support arms 42 and 44 are connected to the arms 98 of the container 80 the trailer is then backed further into position against the container 80. While the trailer is backed up the inner telescoping members 52 and 56 are retracted into the sleeve members 50 and 54. Abutments within the sleeve members 50 and 54 engage against the inner telescoping members 52 and 56 to prevent the further retraction of these members 52 and 56 into the sleeves 50 and 54. In this manner the inner telescoping members are placed into the travel position.

After the trailer has been lifted into the travel position a chain 114 which functions as a means for locking the container 80 in place on the trailer 10 is connected about the rear portion of the container 80 and locked into place against the rear surface of the container 80. When the container is to be released and placed into the unload position the turn buckle 70 is released from the bracket 76 and the cylinder 32 is depressurized thus allowing the lift arm 26 and support arms 42 and 44 to pivot clockwise to gradually lower the container 80 to the ground. After the container 80 is deposited on the ground the support arms 42 and 44 may be placed into the unlaod travel position (vertical) with the chains 114 securing the arms 42 and 44 in the vertical position.

While in the foregoing there has been described a presently preferred embodiment of this invention it should be understood that other modifications may be made to the invention without departing from the true spirit and scope thereof.

What is claimed is:

1. A bottomless article transport trailer for transporting a sturdy, rigid article comprising, in combination:
   a support frame mounted for vehicular movement on a pair of wheels, said frame having a cross member and a pair of side members said cross member connected to the forward ends of the side members;
   a hitch section connected to said cross member;
   a lift means operable between an article conveying position and an article release position connected to said hitch section adjacent the cross member of the support frame and connectable with the front end of the article to be transported, said lift means comprising a lift arm having a pivoting end and an article engaging end, said pivoting end pivotally connected to said hitch section, and a power means pivotally connected at one portion thereof to said hitch section and at another portion thereof to said lift arm intermediate said pivoting end and said article engaging end, said article engaging end of said lift arm adapted to engage with the front end of the article and to lift said front end of the article upwardly and inwardly of the support frame when said power means is actuated; and
   a pair of elongated support arms freely pivotally connected to the rear portions of the side members of the support frame said support arms independently pivotal in relation to said lift means and adapted to engage against opposite sides of the rear portion of the article, said support arms adapted to cooperate through said article with said lift means to lift the rear portion of the article upwardly and inwardly of the support frame when the lift means is operated to thereby transmit force from said lift means through said article to said support arms whereby the article may be suspended for vehicular movement within the bottomless trailer above the surface supporting the wheels of the trailer.

2. The invention as set forth in claim 1 wherein said support arms when engaged with said article extend upwardly away from said lift means.

3. The invention as set forth in claim 1 wherein the article to be transported includes a pair of extension members connected to the rear portion of said article and extending outwardly from the opposite sides of the rear portion of the article and wherein said support arms include a pair of collar members connected to the article engaging ends of the support arms respectively and adapted to receive and engage with the extension members on the article.

4. The invention as set forth in claim 1 wherein said collar members are open ended and U-shaped collar members and including a pair of restraining pins insertable through the ends of said collar members to secure the extension members within said collar members.

5. The invention as set forth in claim 1 wherein each of said support arms includes an outer sleeve member pivotally connected to the end of the rear end of one of said side members of said frame and a telescoping inner member within said sleeve member and having an article receiving means connected to the end thereof whereby the inner telescoping member may be adjustably extended to engage with the article.

6. The invention as set forth in claim 1 including means connected to the side members at the rear portions thereof for locking said container in place within the said support frame when said article is in article conveying position.

7. The invention as set forth in claim 1 including guide means connected to the side members of said support frame for guiding said article into said frame.

8. The invention as set forth in claim 7 wherein said guide means comprises roller members rotationally connected to said side members about a vertical axis of rotation.

* * * * *